United States Patent [19]

Mohnach et al.

[11] 4,416,032
[45] Nov. 22, 1983

[54] CONNECTOR ADAPTOR FOR PIN-TYPE BLADE

[76] Inventors: Michael G. Mohnach, 252 Green Acres Dr.; William H. Harbison, 182 Moorland Dr., both of Valparaiso, Ind. 46383

[21] Appl. No.: 308,403

[22] Filed: Oct. 5, 1981

[51] Int. Cl.³ .............................................. B60S 1/40
[52] U.S. Cl. ................................................ 15/250.32
[58] Field of Search ........................ 15/250.32–250.42

[56] References Cited

U.S. PATENT DOCUMENTS

| 3,757,377 | 9/1973 | Hayhurst. | |
|---|---|---|---|
| 3,824,648 | 7/1974 | van den Berg et al.. | |
| 3,961,394 | 6/1976 | Steger. | |
| 4,057,869 | 11/1977 | Longman et al.. | |
| 4,120,069 | 10/1978 | Sharp et al.. | |
| 4,180,885 | 1/1980 | Thornton et al.. | |
| 4,214,343 | 7/1980 | Dudek | 15/250.32 |
| 4,321,725 | 3/1982 | Journee | 15/250.32 |

FOREIGN PATENT DOCUMENTS 874604 10/1970 Italy.

*Primary Examiner*—Peter Feldman

[57] ABSTRACT

An adaptor for mounting a pin-type wiper blade on a hook-type wiper arm includes first and second walls separated by a shouldered pin and a pair of struts. A U-shaped spring clip is disposed over the shouldered pin, the spring clip is disposed over the shouldered pin, the spring clip having outwardly directed tangs in the legs thereof which are captured within apertures disposed in the hooked end of the hook-type wiper arm. Each of the walls of the adaptor includes an opening, the openings being aligned with apertures in the primary yoke of the wiper blade such that a retention pin can pass therethrough and be captured by a spring clip in the wiper blade.

6 Claims, 4 Drawing Figures

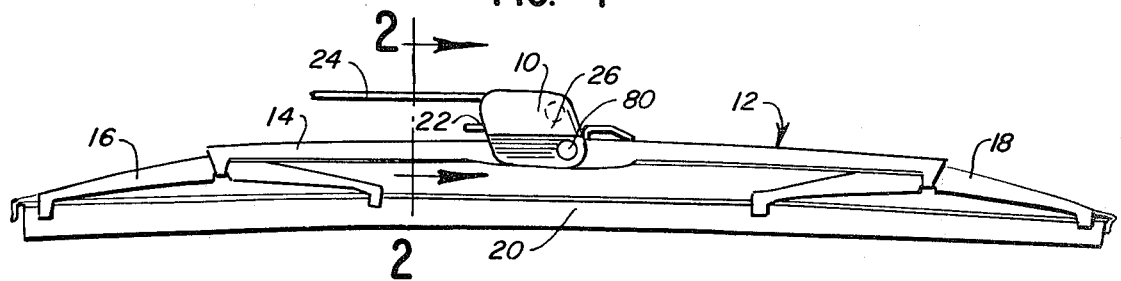
FIG. 1
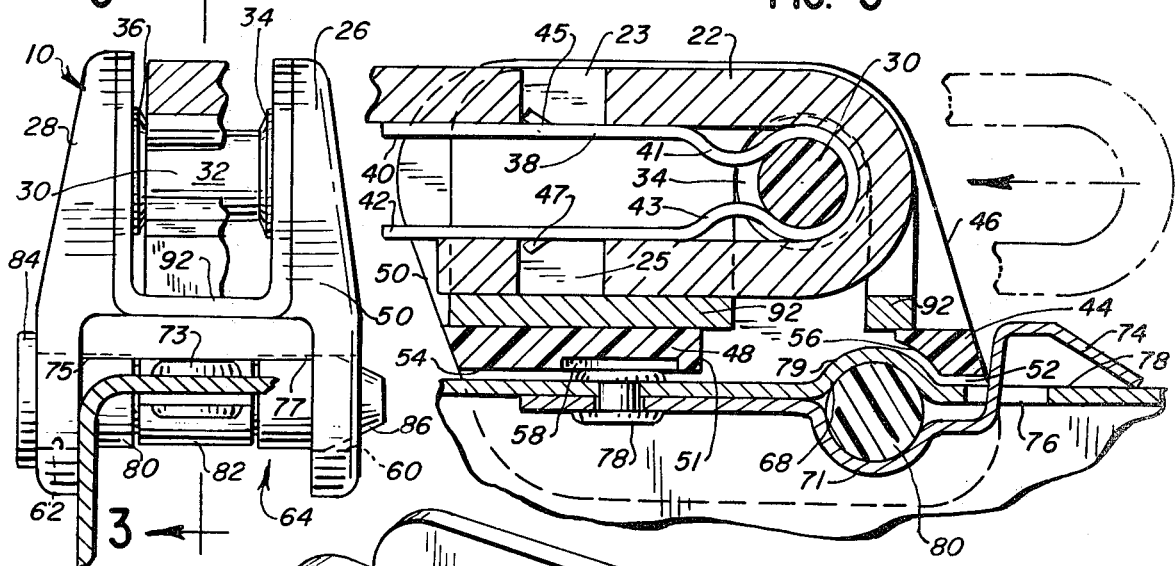
FIG. 2
FIG. 3
FIG. 4

CONNECTOR ADAPTOR FOR PIN-TYPE BLADE

DESCRIPTION

1. Background Of The Invention

The present invention relates generally to an apparatus for mounting a windshield wiper blade on a wiper arm, and more particularly to an adaptor for mounting a pin-type wiper blade on a hook-type wiper arm.

One type of adaptor for mounting a pin-type wiper blade on a hook-type wiper arm utilizes a pair of side walls or panels, each of which has a cylindrical socket near the bottom thereof. A protrusion is located on either side of the primary yoke of the wiper blade, such protrusions being sized to fit snugly within the sockets.

However, to secure the adaptor to the wiper blade, it is necessary to force apart the walls or panels of the adaptor so that the tabs can be seated in the sockets. In cold weather, the adaptor walls may lose resiliency, resulting in a less than effective securing of the adaptor to the wiper blade. Furthermore, in cold weather the adaptor may become sufficiently brittle so as to break when pressure is applied in an attempt to secure the adaptor to the blade.

SUMMARY OF THE INVENTION

In accordance with the present invention, an adaptor for securing a pin-type wiper blade to a hook-type wiper arm includes first and second walls which are parallelogram-shaped and which have aligned openings therein. The adaptor is secured to the wiper blade by inserting a retention pin through one of the openings in the walls of the adaptor, through aligned apertures in the primary yoke of the wiper blade, where the pin is captured by a spring clip mounted within the wiper blade and through the opening in the other wall of the adaptor. Consequently, it is not necessary to spread apart the walls of the adaptor to mount the adaptor on the wiper blade, and hence the above-noted disadvantages are avoided.

A shouldered pin extends between the two walls and a U-shaped spring clip is placed thereover which has outwardly disposed tangs in each of the legs thereof. The hooked end of the wiper arm is slid over the spring clip such that the tangs are captured within apertures in the hooked end of the arm.

The pin-type wiper blade is therefore securely mounted on the hook-type wiper arm, and is easily installed or removed even in cold weather.

BRIEF DESCRIPTION OF THE DRAWINGS

FIG. 1 is an elevational view of the adaptor of the present invention in conjunction with a pin-type wiper blade and a hook-type wiper arm;

FIG. 2 is a sectional view taken along line 2—2 of FIG. 1 with portions broken away to reveal portions of the adaptor;

FIG. 3 is a sectional view taken along line 3—3 of FIG. 2; and

FIG. 4 is an enlarged, exploded perspective view of the adaptor and retention pin of the present invention in conjunction with a portion of the wiper blade.

DESCRIPTION OF THE PREFERRED EMBODIMENT

Referring now to FIG. 1, there is illustrated an adaptor 10 in conjunction with a pin-type wiper blade 12. The wiper blade 12 includes a primary yoke 14 which supports a pair of secondary yokes 16,18 which in turn mount a conventional resilient wiper element 20. The adaptor 10 allows mounting of the pin-type blade 12 on a hooked end 22 of a hook-type wiper arm 24. Aligned apertures 23,25 are formed in the upper and lower portions of the hooked end 22 of the arm 24.

Referring also to FIGS. 2-4, the adaptor 10 includes first and second side walls 26,28 which are parallelogram-shaped in side elevation. A shouldered pin 30 extends between the side walls 26,28 and includes a reduced diameter portion 32 disposed between shoulders 34,36. A U-shaped spring clip 38 is disposed over the reduced diameter portion 32 of the shoulder pin 30. The U-shaped spring clip 38 includes first and second legs 40,42, each of which have an inturned portion 41,43, respectively, which restrain the U-shaped clip on the shouldered pin 30. The spring clip 38 also includes outwardly directed flanges 45,47, respectively, which are used to secure the adaptor 10 to the hooked end 22 of the wiper arm 24, in a manner to be more fully described hereinafter.

A first support strut 44 is located adjacent a front portion 46 of the adaptor 10 and extends between the side walls 26,28 below the shouldered pin 30. A second support strut 48, shown in FIG. 3, is disposed between the side walls 26,28 and extends from a point spaced rearwardly of the first support strut 48 to a rear portion 50 of the adaptor 10. An opening 51 is provided between the first and second struts 44,48, which opening 51 begins roughly midway between the front portion 46 and the rear portion 50 and extends forwardly thereof. The support struts 44,48 have lower surfaces 52,54, respectively, which are coplanar. The first support strut 44 also includes a curved undersurface 56 while a cylindrical recess 58 is disposed in the lower surface 54 of the second support strut 48.

Circular holes or openings 60,62 are disposed in the side walls 26,28, respectively. The openings 60,62 are aligned in a straight line relationship with each other and with the curved undersurface 56 of strut 44 and are disposed near the front portion 46 of the adaptor 10.

The support struts 44,48 and the portions of the walls 26,28 extending downwardly therefrom form a skirt 64 which fits over a mounting portion 66 of the primary yoke 14 of the pin-type wiper blade 12.

A channel 68 extends throughout the mounting portion 66 of the primary yoke 14 transverse to the length thereof. A spring clip 72 is mounted within the mounting portion 66 by means of a rivet 73. The spring clip 72 includes a release tang 74 which extends through an aperture 76 in a face 78 of the mounting portion 66 and has a curved retention portion 71 intersecting the aligned apertures 75,77 in the depending walls of the mounting portion 66 of the yoke 14. The spring clip 72 is sufficiently resilient to move out of alignment with the aligned apertures 75,77 in the channel 68 when the tang 74 is released.

A retention pin 80 having a reduced diameter central section 82 is used to secure the adaptor 10 to the yoke 14. The retention pin 80 also includes an enlarged diameter portion or head 84 on one end thereof and a tapered portion 86 on the other end thereof.

The adaptor 10 is secured to the primary yoke 14 by placing the skirt 64 over the mounting portion 66 of the yoke 14 such that the openings 60,62 are aligned with the apertures 75,77 in the channel 68. As shown in FIG. 3, when the adaptor is mounted on the arm 14 in this fashion, the lower surfaces 52,54 are spaced slightly from the face 78 of the yoke and the curved undersurface 56 of strut 44 is located adjacent an upper surface of an upraised portion 79 of the channel 68.

The retention pin 80 is forced into opening 60 and aperture 75 with the tapered engaging and deflecting curved portion 71 of spring clip 72 thereby moving the spring clip 72 out of alignment with the apertures 75,77. The retention pin 80 is then pushed through the channel 68 and through opening 62 and aperture 77. The resiliency of clip 72 will snap the curved portion 71 of the clip 72 into reduced diameter portion 82 in the pin to capture the retention pin 80 and thereby secure the adaptor 10 to the primary yoke 14 of the pin-type wiper blade 12. When the pin 80 is inserted fully into the channel 68, the head 84 thereof contacts one of the walls 26,28. The adaptor 10 can be removed from the yoke 14 by depressing the tang 74 which removes the curved portion 71 from the pin 80 making it possible to remove the pin 80 thereby releasing the adaptor from the blade.

The lower surfaces 52,54 of the support struts 44,48 are spaced sufficiently close to the face 78 of the primary yoke 14 to prevent substantial rotation side to side of the adaptor 10 relative to the yoke 14. Clearance for the upraised portion 79 of the channel 68 is provided by the spacing or opening 51 between the struts 44,48 and by the curved undersurface 56.

The adaptor 10, and hence the wiper blade 12, is secured to the hook-type wiper arm 24 by sliding the hooked end 22 over the U-shaped spring clip 38. The hooked end 22 is provided with apertures 23,25 which capture the tangs 45,47, respectively, of the arm end. The legs 40,42 of the spring clip 38 are pre-bent outwardly away from each other and become compressed to the shape shown in FIG. 3 when the hooked end 22 is placed thereover. An outward force is thereby applied by the legs 40,42 against the inside of the hooked arm 22, causing the tangs 45,47 to be firmly captured within the apertures 23,25.

If the hooked end 22 does not have a thickness sufficient to prevent wobbling or movement of the adaptor 10 when mounted thereon, a U-shaped liner or shim 92 may be provided which fills the space between the hooked end 22 and the support strut 48. The shim 92 may extend up the inside of the walls 26,28 if desired.

We claim:

1. An adaptor for connecting a pin-type wiper blade to a hook-type wiper arm, said wiper blade having a channel therethrough extending transversely to the length thereof and a spring retention clip mounted therein, said wiper arm having a hooked end comprising:
    first and second spaced apart walls, both walls being parallelogram-shaped and having aligned openings in the lower portion thereof, said openings being aligned with said channel;
    a shouldered pin having a reduced diameter portion extending between an upper portion of the first and second walls;
    a U-shaped spring clip disposed about the reduced diameter portion of the shouldered pin, said hooked end of said wiper arm being disposed over said spring clip and said shouldered pin to secure the adaptor to the wiper arm; and
    a retention pin having a reduced diameter central section and an enlarged diameter portion on one of the ends thereof, said pin extending through said aligned openings and said channel so that the reduced diameter central section is captured by the spring retention clip and the enlarged diameter portion contacts one of said walls to secure the adaptor to the wiper blade.

2. The adaptor of claim 1, further including at least one support strut extending between said walls.

3. The adaptor of claim 1, wherein the U-shaped spring clip includes a pair of legs, each leg having an inturned portion adjacent the shouldered pin to restrain the U-shaped clip thereon.

4. The adaptor of claim 1, wherein the retention pin is removable from the aligned openings and the channel to allow the wiper blade to be separated from the adaptor.

5. The adaptor of claim 2, wherein the wiper blade includes a face and wherein the adaptor has a lower surface which is disposed sufficiently close to the face of the wiper blade to prevent substantial rotation of the adaptor about the wiper blade and to permit rotation of the adaptor about the axis of the retention pin.

6. The adaptor of claim 1, wherein the hooked end includes a pair of apertures and wherein the U-shaped spring clip includes a pair of legs, each leg having an outwardly directed tang which is captured within one of the apertures.

* * * * *

UNITED STATES PATENT AND TRADEMARK OFFICE
CERTIFICATE OF CORRECTION

PATENT NO. : 4,416,032

DATED : November 22, 1983

INVENTOR(S) : Michael G. Mohnach and William H. Harbison

It is certified that error appears in the above-identified patent and that said Letters Patent is hereby corrected as shown below:

In the Abstract, line 5, delete "the spring clip is disposed over the shouldered pin,"

Column 2, line 18, delete "flanges" and substitute therefor -- tangs --

Signed and Sealed this

Twentieth Day of March 1984

[SEAL]

Attest:

GERALD J. MOSSINGHOFF

Attesting Officer　　Commissioner of Patents and Trademarks